US010142526B2

(12) United States Patent
Eromäki et al.

(10) Patent No.: US 10,142,526 B2
(45) Date of Patent: Nov. 27, 2018

(54) SELF-ALIGNING MULTI-PART CAMERA SYSTEM

(71) Applicant: Microsoft Technology Licensing, LLC, Redmond, WA (US)

(72) Inventors: Marko Eromäki, Tampere (FI); Urho Konttori, Espoo (FI); Eero Tuulos, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 15/222,898

(22) Filed: Jul. 28, 2016

(65) Prior Publication Data

US 2018/0035024 A1    Feb. 1, 2018

(51) Int. Cl.
*H04N 5/225* (2006.01)
*G03B 5/02* (2006.01)
*G03B 17/04* (2006.01)
*G06F 1/16* (2006.01)
*H04M 1/02* (2006.01)

(52) U.S. Cl.
CPC ............. *H04N 5/2254* (2013.01); *G03B 5/02* (2013.01); *G03B 17/04* (2013.01); *G06F 1/1609* (2013.01); *G06F 1/1615* (2013.01); *H04M 1/0206* (2013.01); *H04M 1/0264* (2013.01); *H04N 5/2253* (2013.01)

(58) Field of Classification Search
CPC ....................................... H04N 5/2251–5/2254
USPC ........................................................ 348/374
See application file for complete search history.

(56) References Cited

U.S. PATENT DOCUMENTS

| | | | |
|---|---|---|---|
| 2,161,243 A | 9/1939 | Boron | |
| 3,722,389 A | 3/1973 | Costa et al. | |
| 7,106,357 B2 * | 9/2006 | Fukuda | G06F 1/1616 348/14.01 |
| 7,116,356 B2 | 10/2006 | Peeples | |
| 7,468,850 B2 * | 12/2008 | Chang | G02B 7/021 348/374 |

(Continued)

FOREIGN PATENT DOCUMENTS

| | | |
|---|---|---|
| CN | 2504663 | 8/2002 |
| CN | 202535454 | 11/2012 |

(Continued)

OTHER PUBLICATIONS

Lee, et al., "Self-Adjustment Module for Phone Camera Lens Assembly", Published on: Jul. 16, 2010 Available at: http://www.aspe.net/publications/Annual_2006/posters/5process/3manu/2077.pdf.

(Continued)

*Primary Examiner* — Anthony J Daniels
(74) *Attorney, Agent, or Firm* — Klarquist Sparkman, LLP

(57) ABSTRACT

A multi-part electronic device has a mode with at least two overlapped device parts comprising a first camera part mounted on a first device part and a second camera part mounted on a second device part. At least one of the first and second camera parts is resiliently mounted such that contact between the first and second camera parts when the first device part and the second device part are overlapped with each other aligns the first camera part and the second camera part within a selected angular deviation between the camera parts' respective optical axes. A camera part having a body and a flexible mount and a method of reducing tilt error are also described.

20 Claims, 9 Drawing Sheets

(56) References Cited

U.S. PATENT DOCUMENTS

| | | |
|---|---|---|
| 8,493,455 B2 | 7/2013 | Ko et al. |
| 8,531,596 B2 * | 9/2013 | Tanida ................ H04N 5/2252 348/373 |
| 8,610,822 B2 | 12/2013 | Weber et al. |
| 2003/0174240 A1 * | 9/2003 | Wada .................. H04N 5/2254 348/374 |
| 2004/0116166 A1 * | 6/2004 | Makishima ......... H04M 1/0214 455/575.1 |
| 2008/0165439 A1 | 7/2008 | Chang |
| 2008/0292306 A1 * | 11/2008 | Watanabe .............. G03B 17/14 396/448 |
| 2009/0059043 A1 * | 3/2009 | Demuynck ......... H04M 1/0216 348/294 |
| 2010/0117460 A1 * | 5/2010 | Liao ................... H02K 41/0356 310/12.16 |
| 2011/0304855 A1 | 12/2011 | Ueki et al. |
| 2013/0163980 A1 * | 6/2013 | Lazaridis ............... G03B 17/14 396/529 |
| 2013/0177304 A1 * | 7/2013 | Chapman ............. G03B 17/565 396/533 |
| 2013/0217451 A1 * | 8/2013 | Komiyama ........... H04M 1/021 455/575.8 |
| 2014/0063265 A1 | 3/2014 | Shukla et al. |
| 2014/0368711 A1 | 12/2014 | O'Brien |
| 2015/0002726 A1 * | 1/2015 | Schmieder ............... G02B 7/08 348/357 |
| 2015/0062422 A1 | 3/2015 | Stern |
| 2015/0288865 A1 | 10/2015 | Osborne |

FOREIGN PATENT DOCUMENTS

| | | |
|---|---|---|
| CN | 202735652 | 2/2013 |
| CN | 203435070 | 2/2014 |
| CN | 103856695 | 6/2014 |
| JP | 03278325 A | 12/1991 |
| WO | 2006028041 A1 | 3/2006 |

OTHER PUBLICATIONS

"International Search Report and Written Opinion Issued in PCT Application No. PCT/US2017/042955", dated Jan. 5, 2018, 17 Pages. (MS # 360115-WO-PCT).

* cited by examiner

SELF-ALIGNING MULTI-PART CAMERA SYSTEM

BACKGROUND

Many kinds of today's electronic devices include a digital camera. Such cameras add to the features and functionality of electronic devices.

One type of electronic device is a multi-part electronic device in which there are multiple parts used in association with each other that are typically coupled together physically. For example, there are two-part electronic devices where first and second parts are coupled together by a hinge, a sliding arrangement or another configuration. Such electronic devices can include mobile devices (including mobile phones), tablets, laptop computers, other types of computing devices, game controllers, etc.

In some multi-part electronic devices, at least two of the multiple parts can be positioned to overlap each other to provide a specific operation for the camera. As just one example, the overlapped mode may provide for additional focusing options based on using optical elements in a second part of the device with a main camera part in a first part of the device when the first and second parts of the device are overlapped.

In practice, it is difficult to achieve suitable alignment between multiple camera parts of a multi-part electronic device that can be moved relative to each other.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for providing a camera part of a multi-part electronic device that can be adjustably mounted such that tilt axis error in the camera part can be reduced to within a selected angular range, thus allowing for suitable alignment. In one implementation, a multi-part electronic device has a mode with at least two overlapped device parts, and comprises a first camera part mounted on a first device part and a second camera part mounted on a second device part. At least one of the first and second camera parts is resiliently mounted such that contact between the first and second camera parts when the first and second device parts are overlapped with each other aligns the first camera part and the second camera part within a selected angular deviation between respective optical axes.

In one implementation, the first camera part comprises a first resilient camera mount attached to the first device part and the second camera part comprises a second resilient camera mount attached to the second device part. The first and second camera parts are positioned at rest in respective protruded positions protruding relative to respective surrounding surfaces. Contact between the first and second camera parts urges at least one of the camera parts to withdraw inwardly relative to its protruded position.

In one implementation, the resilient mount is sized to fit around the respective camera part and to seal a space between the respective camera part and an opening formed in the respective device part for the camera part. The resilient mount can be configured for adhesive mounting to an inner surface of the respective device part. Further, the resilient mount can be configured to allow for translation of the respective camera part in lateral directions approximately perpendicular to an optical axis of the respective camera part.

In one implementation, the resilient mount comprises a fold of material configured to allow for translation of the respective camera part in lateral directions while the mount is installed on the respective device part.

In one implementation, each of the first and second camera parts comprises a protection window, and wherein the contact between the first and second camera parts occurs between the respective protection windows.

In one implementation, the multi-part electronic device comprises at least one pair of first and second alignment members, wherein the first alignment member is positioned on the first device part and the second alignment member is positioned on the second device part. The first and second alignment members are configured to interact with each other to move the at least one of the first and second camera parts laterally and into alignment with the other of the first and second camera parts.

In one implementation, the first and second alignment members are magnetic. The first and second alignment members are positioned relative to each other such that a magnetic force capable of moving at least one of the first camera part or the second camera part is generated when the first and second device parts are overlapped with each other. In one implementation, the first magnetic member is stationary and the second magnetic member is movable.

In one implementation, a camera part for an electronic device comprises a body for positioning within a part of a multi-part electronic device, the body having an outer end positionable to extend through an opening in the part and protrude relative to a surrounding outer surface and a flexible mount for adjustably coupling the body to an inner surface of the part.

In one implementation, a method of reducing tilt error in a camera of a multi-part electronic device comprises mounting a first camera part to a first device part such that the camera part is movable relative to the first device part, mounting a second camera part to a second device part, overlapping the first device part and the second device part such that the first camera part and the second camera part contact each other, and urging at least the first camera part to move and reduce tilt error based on the contact between the first camera part and the second camera part.

The foregoing and other objects, features, and advantages will become more apparent from the following detailed description, which proceeds with reference to the accompanying figures.

DETAILED DESCRIPTION

Figure 1A:
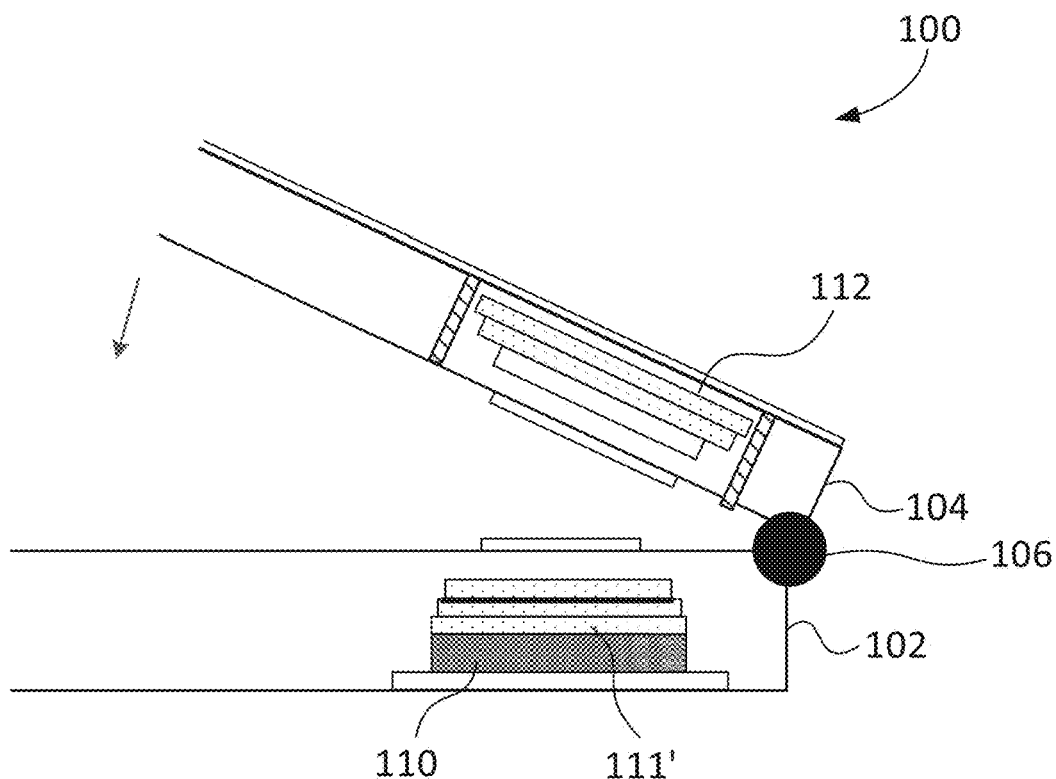
FIGS. 1A and 1B are schematic side elevation views of a portion of a multi-part electronic device having multiple camera parts shown in a partially open position (FIG. 1A) and in a closed position (FIG. 1B).
Figure 1B:
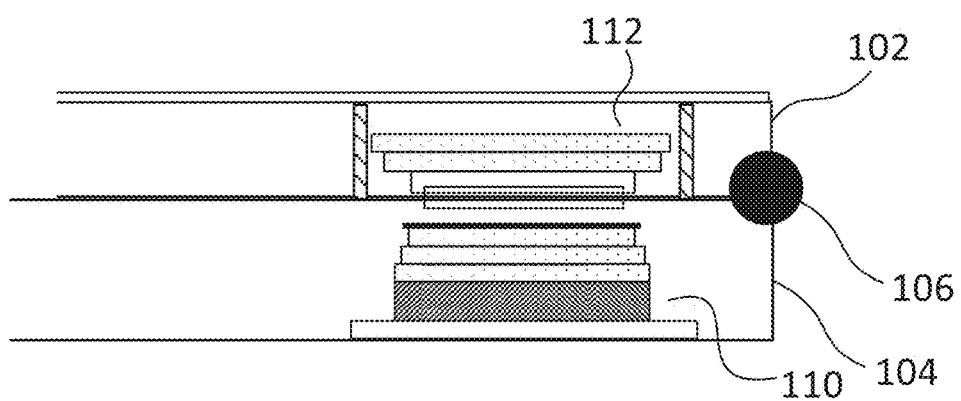

FIGS. 1A and 1B are side elevation views of a representative multi-part electronic device 100 having multiple camera parts. In the representative implementation of FIGS. 1A and 1B, the multiple parts of the multi-part electronic device 100 include a first device part 102 and a second device part 104 that are coupled to each other, e.g., by a hinge 106. The first device part 102 has a first camera part 110. The second device part 104 has a second camera part 112.

The first camera part 110 and the second camera part 112 have at least one mode of operation in which they are coupled together, such as in the closed position of the device 100 as shown in FIG. 1B. Optionally, one or both of the first camera part 110 and the second camera part 112 can have a mode of operation in which it is used individually. Although two device parts are illustrated in FIGS. 1A and 1B for convenience, the multi-part device 100 can include more than two parts. Similarly, the multi-part device can include more than two camera parts. It is noted that the terms "first" and "second" are used for clarity only, and do not imply any logical precedence between the parts. Rather, the parts are interchangeable, so, e.g., the first device part can have the second camera part and the second device part can have the first camera part.

As used herein, a "camera part" refers to a device, module, unit, element, or part thereof, in which there is at least one image sensor capable of capturing digital image frames comprising image data which can be used to reproduce and display digital images. Such a camera may be implemented, for example, as a plain digital image sensor which is connected to an appropriate external power supply and control unit(s) and equipped with an appropriate housing and optical system. In other implementations, a camera may be configured as an imaging module or camera module which itself may comprise in addition to the digital sensor element, any appropriate mechanical and optical elements, as well as control electronics. As used herein, the "first camera part" and "second camera part" together include all or some subset of the various camera components. Each of the first camera part and the second camera part includes at least one component effecting the operation when the first camera part and the second camera part are coupled together for use in an operation mode as is described below in greater detail.

Figure 2:
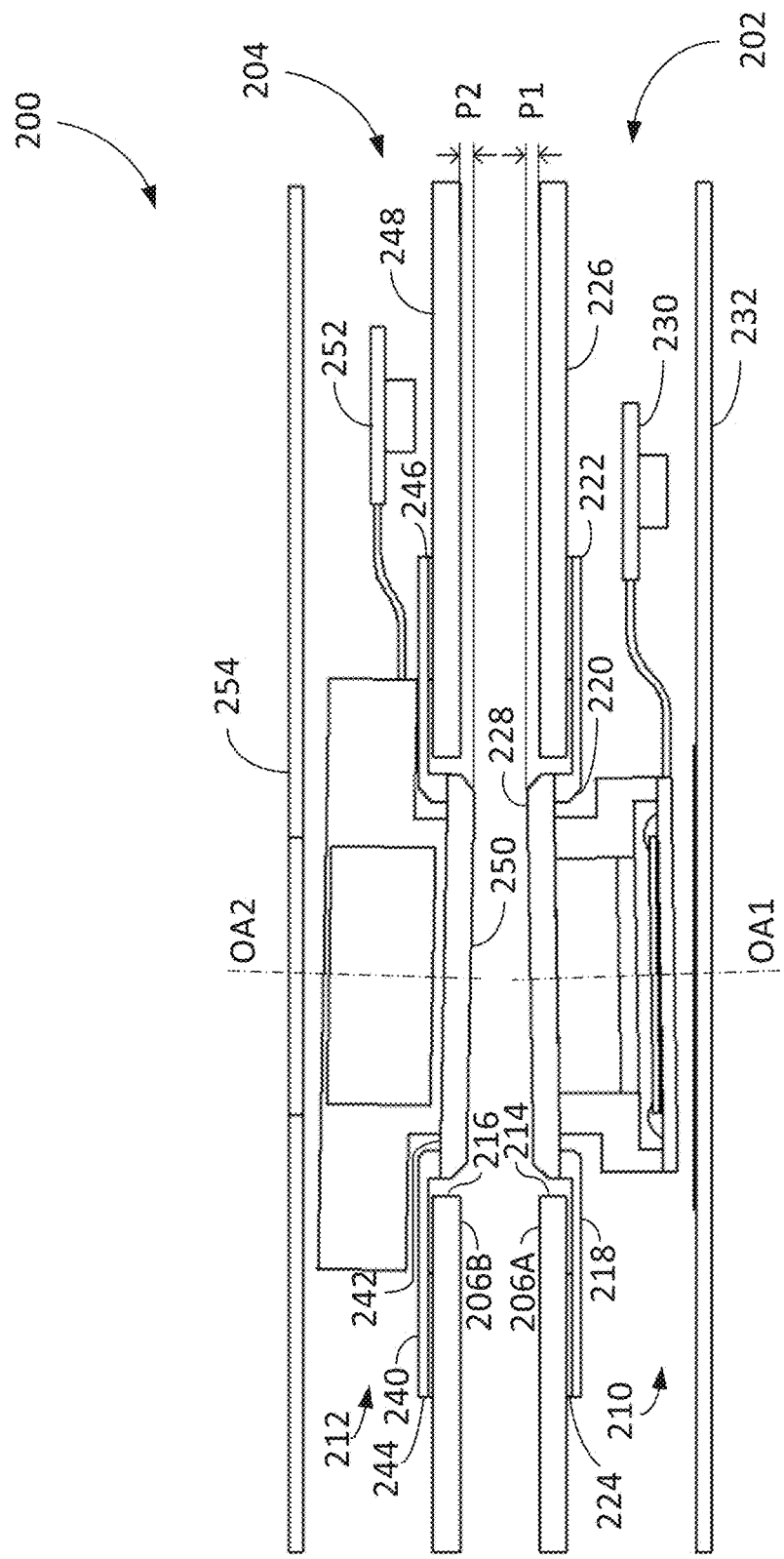
FIG. 2 is a side elevation view of a portion of a multi-part electronic device having multiple camera parts that are shown slightly separated from each other and before alignment.

FIG. 2 is a side elevation view of a portion of a multi-part electronic device having multiple camera parts that are shown slightly separated from each other and before alignment has taken place. As can be seen in FIG. 2, an optical axis as OA1 for a first camera part 210 in a first device part 202 is slightly out of alignment with a second optical axis OA2 of a second camera part 212 in a second device part 204. In the first device part 202, the first camera part 210 is configured to extend through a first camera part opening 214 and protrude slightly by a protrusion distance P1 relative to an adjacent surface 206A. In the illustrated implementation, the first camera part 210 has a protection window 228 or other outermost component that protrudes relative to the surrounding structure.

In the implementation of FIG. 2, the second camera part 204 is configured similarly. That is, the second camera part 204 is configured to extend through a second camera opening 216 and protrude slightly by a protrusion distance P2 relative to an adjacent device part surface 206B. In some implementations, the protrusion distance P1, P2 for each of the camera parts 210, 212 is about 0.15-0.20 mm.

The first camera part 210 is resiliently coupled to first device part 202 by a first camera mount 218. At least a portion of the first camera part mount 218 is adjustable to allow the first camera part 210 to move relative to the first device part 202, as is described in detail below. In the illustrated implementation, the first camera part mount is adjustable by way of being at least partially resilient. Similarly, the second camera part 212 can be adjustably mounted relative to the second device part 204 by a second camera mount part 240. The second camera mount part 240 can have at least a resilient portion allowing the second camera part 212 to move relative to the second device part 204, as is also described below. It should be noted that in some embodiments, only one of the camera parts 210, 212 is resiliently mounted, and the other is fixed.

Figure 3:
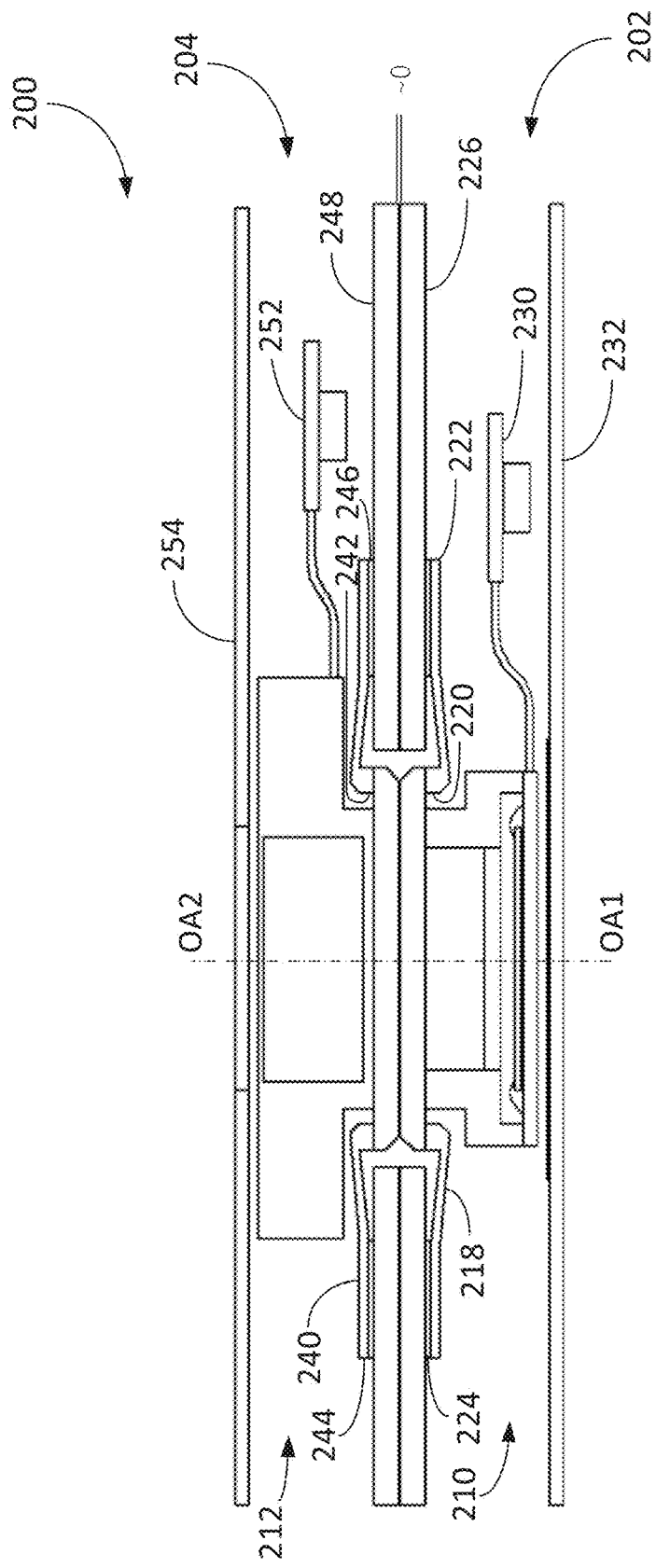
FIG. 3 is a side elevation view of the multi-part electronic device of FIG. 2 in a closed position in which contact between the multiple camera parts has aligned the camera parts relative to each other.

As shown in FIG. 3, when the multi-part electronic device is moved to a closed position, the first camera part 210 and the second camera part 212 contact each other. Because the contact is configured to occur precisely between geometric features having a known relationship to each other, each camera part self-aligns, and, as a result, the pair of camera parts are mutually aligned. More specifically, the contact between the first and second camera parts 210, 212 can be configured to occur along precision surfaces such as respective surfaces of the protection window 228 and the protection window 250, with this contact between the camera parts 210, 212 tending to move each slightly on account of the resiliency of its camera part mount 218, 240, respectively.

The flatness grade and stability of the glass, plastic or other material used for the protection window or other outermost component can be selected to ensure that the surface provides sufficient alignment accuracy. Conventional glass and plastic materials used for such applications are sufficient in this regard. As an example, for a 10 mm diameter window, one side of the window needs to be within approximately 29 µm of the opposite side of the same window to ensure that the deviation in the tilt axis for that window is about 10 minutes (also written as 10') or less. The protection window may be used as a datum surface during assembly of the camera part, so there are advantages to relying on its known attributes in operation of the electronic device as well.

The camera mounts 218, 240 can be made of rubber, soft foam, silicon, latex or another suitable material having sufficient flexibility and resiliency for the specific application. The camera mounts 218, 240 also serve to seal the respective openings from intrusion of dust, moisture and other undesired substances.

For sake of illustration, the optical axis OA1 and the optical axis OA2 would appear to be in perfect alignment in FIG. 3. In practice, however, alignment within a selected angular deviation range is sufficient. For example, in some implementations, it is sufficient for the optical axes OA1, OA2 to be aligned with 10' (i.e., such that their respect tilt angles together combine for a tilt error of 0 to 10'). In some implementations, the physical self-alignment approach described herein is used in conjunction with digital techniques that adjust one or more parameters of camera output to compensate for position errors.

Figure 4:
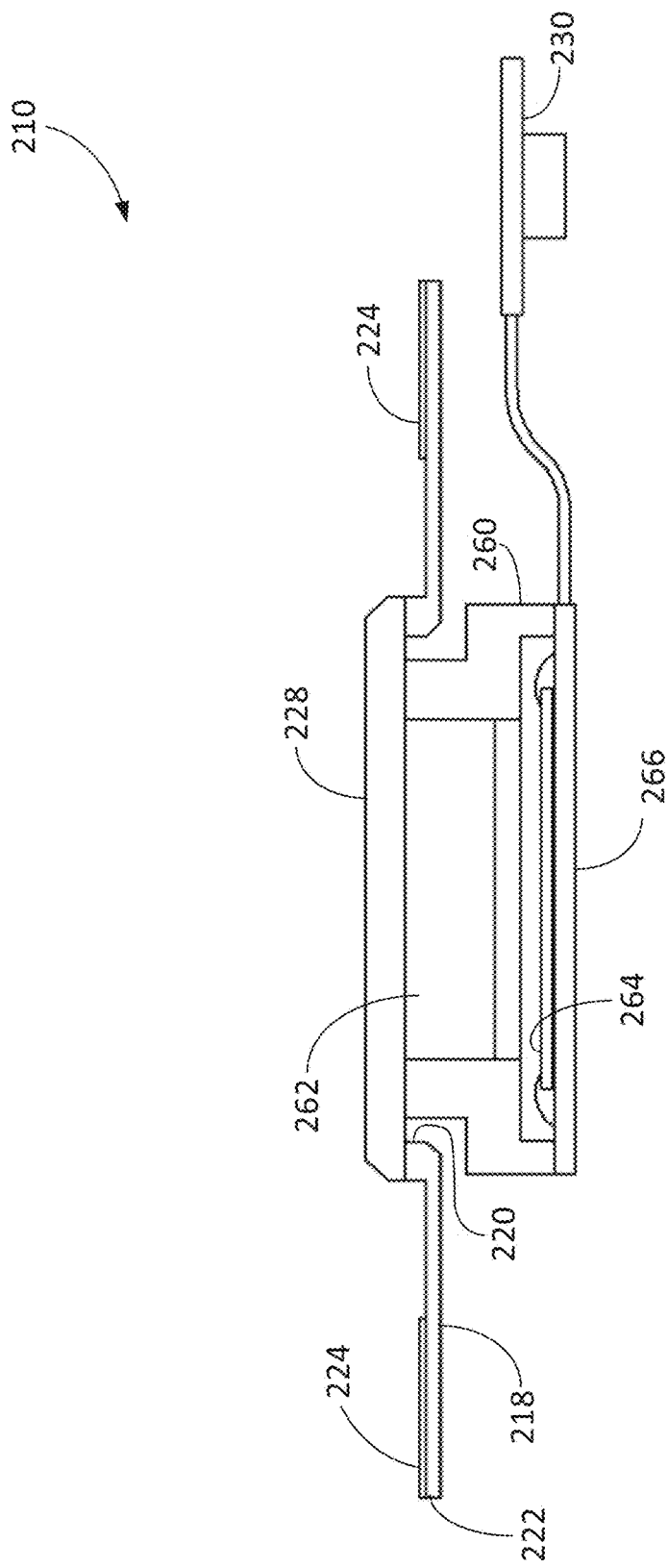
FIG. 4 is a side elevation view of a camera part having a self-aligning mount shown in isolation.

FIG. 4 is a side elevational view of the first camera part 210, which is shown in isolation for clarity. The camera mount 218 has an inner periphery 220 and an outer periphery 222. The camera mount 218 can be secured in place on an interior surface 226 (FIG. 3) of the device part with suitable adhesive 224. In some implementations, an adhesive tape can be used. The protection window 228 is secured to a housing 260 (or body). The housing 260 can house optical elements, including one or more lenses, filters, etc., which are shown schematically at 262, and an image sensor 264. The image sensor 264 can be supported by a printed circuit board or printed wire board 266 having a connector 230.

Figure 5:
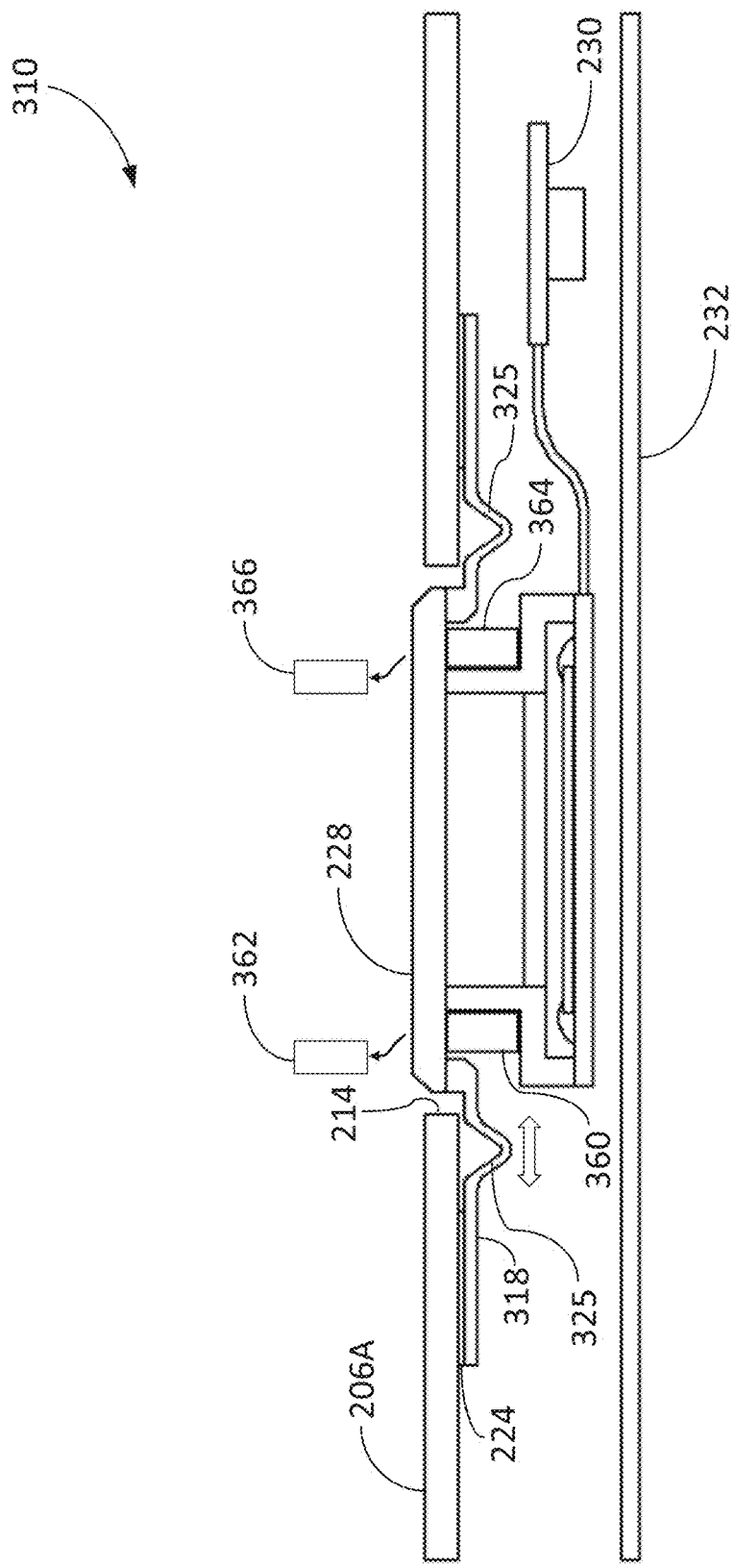
FIG. 5 is a side elevation view of a camera part according to another implementation that is suitable for use as one the multiple camera parts.

FIG. 5 is a side elevational view of another implementation having two additional optional features. In some scenarios, it is desirable to shift one or both of the camera parts, such that one is moved laterally relative to the other, as well as to adjust the tilt of the optical axes. For example, it is possible that bringing the protection windows into contact with each other causes the optical axes to approach parallelism with each other, but that they are laterally offset from each other and thus not coaxial. So, one or both camera mounts can be configured to provide for lateral movement in the direction of the double arrow shown in FIG. 5 and in perpendicular directions in the same plane.

In the example of FIG. 5, a first camera part 310 has a camera mount 318 that is similar the camera mount 218 described above, but includes a fold, baffle or other structure 325 along at least portions of its periphery that can deform to permit the protection window 228 and attached housing to move laterally while the seal is maintained.

Second, the first camera part can include one or more pairs of magnets to assist in achieving the lateral movement necessary for alignment. For example, there can be a first pair of magnets, such as a magnet 360 mounted to the movable housing and a magnet 362 of a second camera part (the second camera part and second device part have been omitted from FIG. 5 for clarity). In the illustrated example, the second magnet 362 has a fixed position, and when the second device part is overlapped with the first device part 310 as shown, the attraction force between the magnets 360 and 362 tends to move the protection window 228 and attached housing to the left in the figure. If provided, the fold 325 shown on the left side of the figure is compressed, and the fold on the right side of the figure tends to be stretched to accommodate the movement in the leftward direction. Optionally, one or more pairs of magnets may be provided, such as the magnets 364 and 366.

Figure 6A:
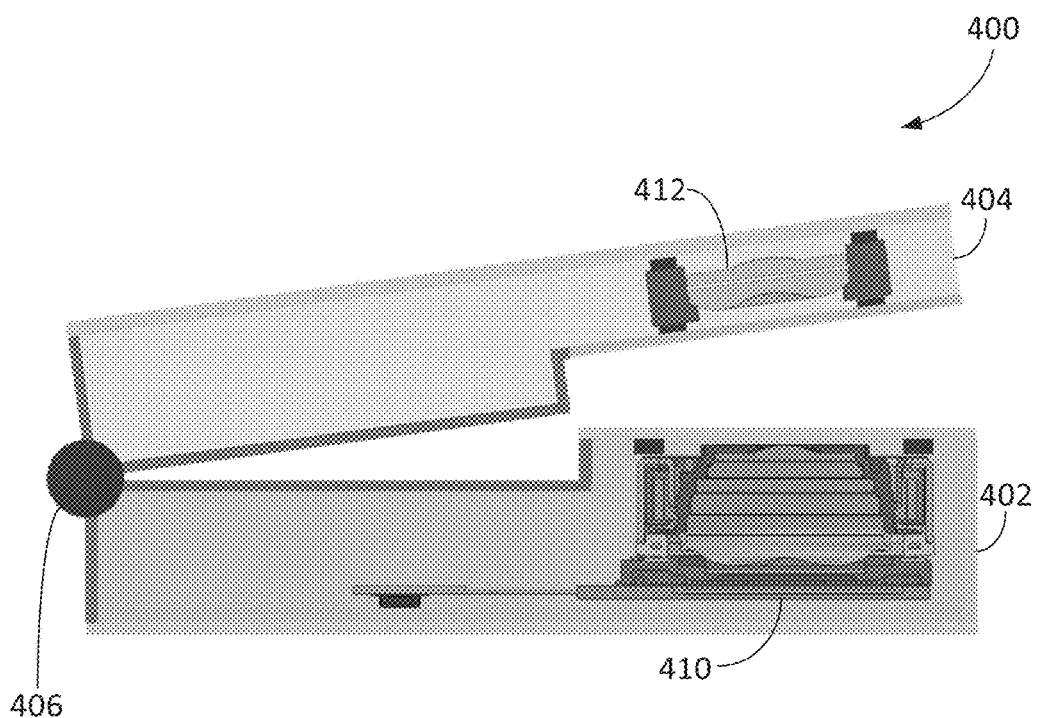
FIGS. 6A and 6B are schematic side elevation views of a multi-part electronic device of another configuration having multiple camera parts shown in a partially open position (FIG. 6A) and a closed position (FIG. 6B).
Figure 6B:
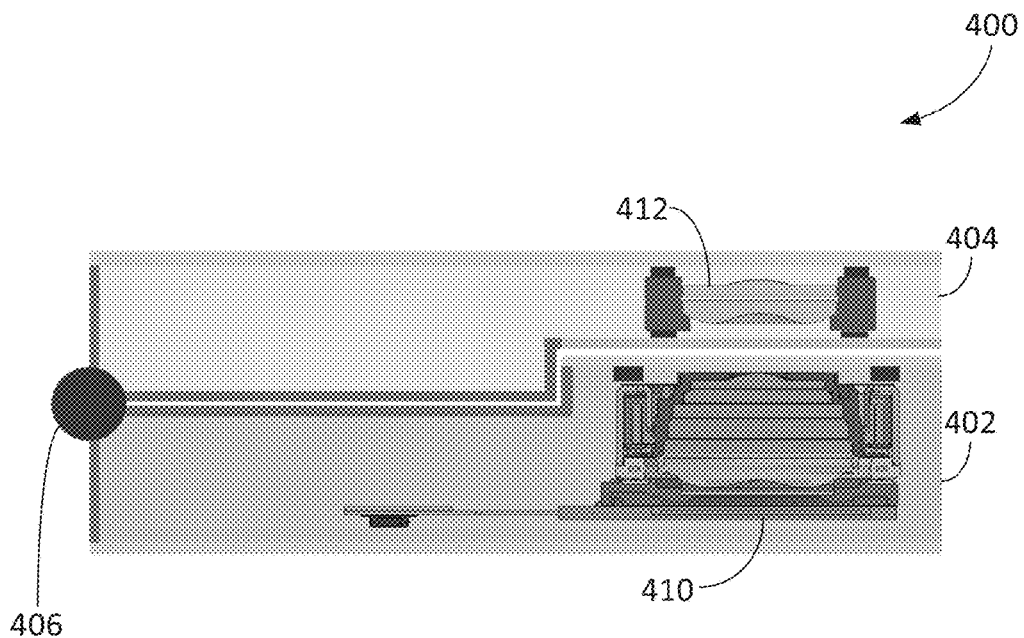

FIGS. 6A and 6B shown an electronic device 400 having a different geometry in which the first and second device parts 402, 404 are step-shaped and nest together. In the electronic device 400, the first camera part 410 and the second camera part 412 are positioned opposite the hinge 406.

Figure 7A:
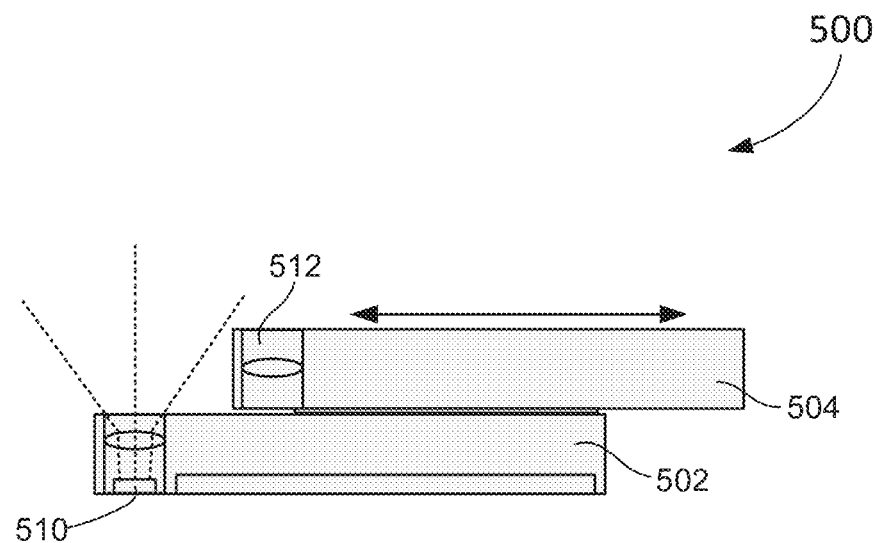
FIGS. 7A and 7B are schematic side elevation views of a multi-part electronic device of another configuration having multiple camera parts that translate relative to one another shown in an open position (FIG. 7A) and a closed position (FIG. 7B).
Figure 7B:
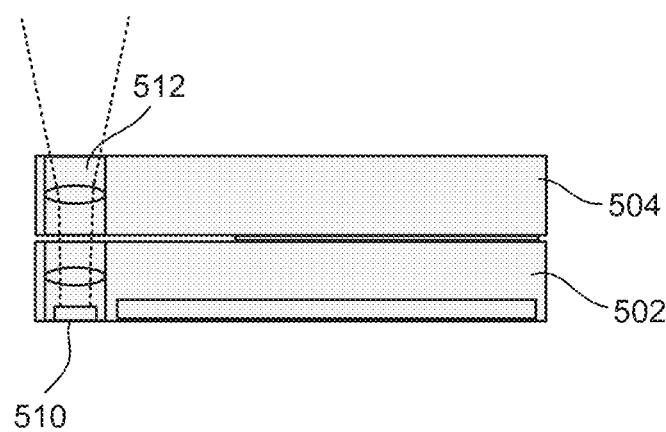

Another representative geometry of a multi-part electronic device is shown in FIGS. 7A and 7B. A device 500 has first and second device parts 502, 504 that slide or translate relative to each other to position first and second camera parts 510, 512 in an overlapped configuration (FIG. 7B).

Other configurations are also possible. In addition, the same approach can be applied to providing self-alignment in a separate accessory lens that is fit over a camera part in an electronic device (e.g., to extend the range of the camera range).

Figure 8:
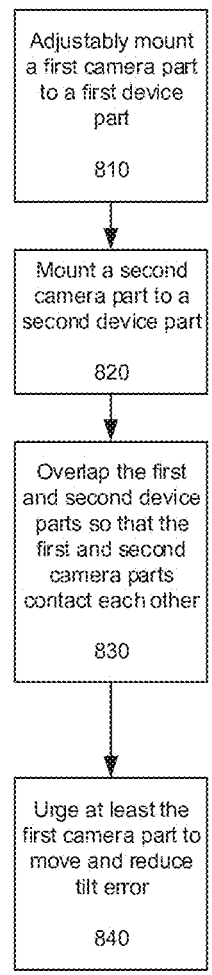
FIG. 8 is a flow chart of a representative method of reducing tilt axis error in a multi-part electronic device.

Referring to FIG. 8, an implementation of a method of reducing tilt error between multiple camera parts in a multi-part electronic device can be described. In step 810, a first camera part is adjustably mounted to a first device part. In step 820, a second camera part is mounted to a second device part. One or both of the camera parts may be adjustably mounted. If one of the camera parts is mounted with sufficient precision to achieve a desired alignment, then only the other camera part may need to be adjustably mounted. In step 830, the first and second device parts are overlapped such that the first and second camera parts contact each other. In step 840, and assuming only the first camera part is adjustably mounted, the contact between the camera parts urges the first camera part to move to adjust its tilt axis and/or lateral position to achieve alignment with the second camera part within a selected range of accuracy.

According to the described approach, because precision surfaces (e.g., the protection windows or other suitable geometric features) are brought into contact with each other, each precision surface's optical axis (which is defined to be normal to that surface) is closely aligned with the other. To the extent that the camera parts move in opposite directions relative to the other in achieving alignment with each other, errors in alignment between each camera part and its respective device part are reduced. As a result, the overall alignment of the optical system is improved.

Figure 9:
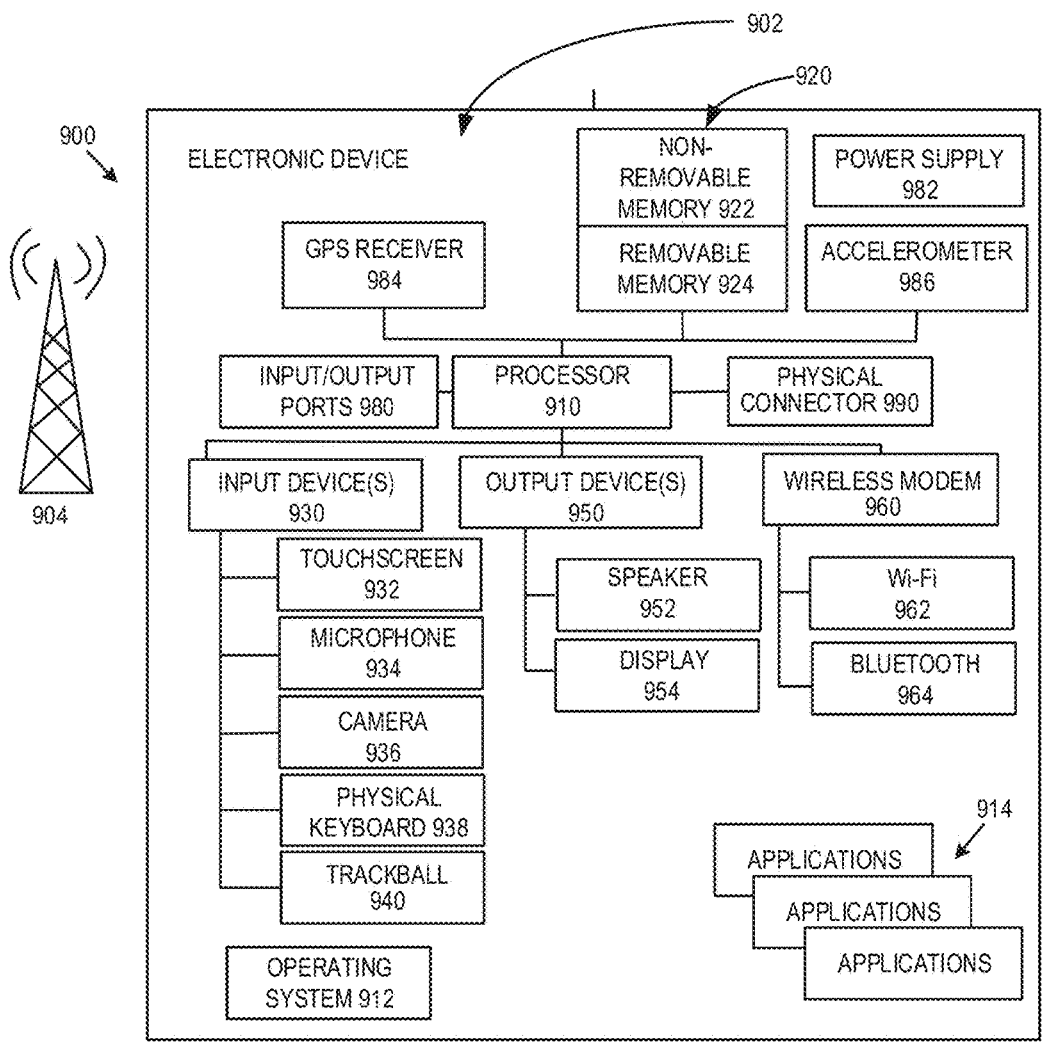
FIG. 9 is a schematic diagram of an electronic or mobile device that can be used in conjunction with the technologies described herein.

FIG. 9 is a system diagram depicting a representative electronic or mobile device 900 according to any of the above implementations, including a variety of optional hardware and software components, shown generally at 902. Any components 902 in the mobile device can communicate with any other component, although not all connections are shown, for ease of illustration. The mobile device can be any of a variety of computing devices (e.g., mobile phone, smartphone, tablet, handheld computer, Personal Digital Assistant (PDA), laptop computer, game controller, etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices can include the piezo electric element 130 (or other type of haptic device). Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

The following paragraphs further describe implementations of the multi-part electronic device, the camera part and an associated method:

A. A multi-part electronic device having a mode with at least two overlapped device parts, comprising:
  a first camera part mounted on a first device part; and
  a second camera part mounted on a second device part,
  wherein at least one of the first camera part or the second camera part is adjustably mounted such that contact between the first camera part and the second camera part when the first device part and the second device part are overlapped with each other aligns the first camera part and the second camera part within a selected angular deviation between respective optical axes.

B. The multi-part electronic device of paragraph A, wherein the first camera part comprises a first resilient camera mount attached to the first device part and the second camera part comprises a second resilient camera mount attached to the second device part, wherein the first and second camera parts are positioned at rest in respective protruded positions protruding relative to respective surrounding surfaces, and wherein contact between the first and second camera parts urges at least one of the camera parts to withdraw inwardly relative to its protruded position.

C. The multi-part electronic device of any of paragraphs A-B, wherein at least one of the first camera part and the second camera part comprises a resilient mount sized to fit around the respective camera part and to seal a space between the respective camera part and an opening formed in the respective device part for the camera part.

D. The multi-part electronic device of any of paragraphs B-C, wherein the resilient mount is configured for adhesive mounting to an inner surface of the respective device part.

E. The multi-part electronic device of any of paragraphs B-D, wherein the resilient mount is configured to allow for translation of the respective camera part in lateral directions approximately perpendicular to an optical axis of the respective camera part.

F. The multi-part electronic device of any of paragraphs B-E, wherein the resilient mount comprises a fold of material configured to allow for translation of the respective camera part in lateral directions while the mount is installed on the respective device part.

G. The multi-part electronic device of any of paragraphs A-F, wherein each of the first and second camera parts comprises a protection window, and wherein the contact between the first and second camera parts occurs between the respective protection windows.

H. The multi-part electronic device of any of paragraphs A-G, further comprising at least one pair of first and second alignment members, wherein the first alignment member is positioned on the first device part and the second alignment member is positioned on the second device part, the first and second alignment members being configured to interact with each other to move the at least one of the first and second camera parts laterally and into alignment with the other of the first and second camera parts.

I. The multi-part electronic device of any of paragraphs A-H, wherein the first and second alignment members are magnetic, and wherein the first and second alignment members are positioned such that a magnetic force is generated.

J. The multi-part electronic device of any of paragraphs A-J, wherein the first magnetic member is stationary and the second magnetic member is movable, and wherein the magnetic force between the first magnetic member and the second magnetic member when the first and second device parts are overlapped is sufficient to cause the second magnetic member to move relative to the first magnetic member.

K. A camera part for an electronic device, comprising:
a body for positioning within a part of a multi-part electronic device, the body having an outer end positionable to extend through an opening in the part and protrude relative to a surrounding outer surface; and
a flexible mount for adjustably coupling the body to an inner surface of the part.

L. The camera part of paragraph K, wherein the outer end comprises a datum surface for the camera part.

M. The camera part of any of paragraphs K-L, wherein the outer end comprises a protection window and the flexible mount is configured to resiliently support the body relative to the part.

N. The camera part of any of paragraphs K-M, further comprising at least one image sensor housed in the body.

O. The camera part of any of paragraphs K-N, further comprising at least one optical element housed in the body.

P. The camera part of paragraphs K-O, further comprising an electrical connection by which the camera part can be connected to an electrical circuit to receive electrical power and controls signals to operate the camera part in camera operations.

Q. The camera part of paragraphs K-P, wherein the flexible mount is configured to be adhered to the inner surface of the part.

R. The camera part of paragraphs K-Q, further comprising at least one magnetic element coupleable with a corresponding magnetic element of another part of the multi-part electronic device.

S. A method of reducing tilt error in a camera of a multi-part electronic device, comprising:
mounting a first camera part to a first device part such that the camera part is movable relative to the first device part;
mounting a second camera part to a second device part;
overlapping the first device part and the second device part such that the first camera part and the second camera part contact each other, and
urging at least the first camera part to move and reduce tilt error based on the contact between the first camera part and the second camera part.

T. The method of paragraph S, wherein mounting the first camera part to the first device part comprises securing a resilient camera part mount to the first device part.

In view of the many possible embodiments to which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A multi-part electronic device, comprising:
a first camera part mounted within a surrounding first resilient camera mount on a first device part; and
a second camera part mounted within a surrounding second resilient camera mount on a second device part, the first and second device parts being coupled together by a common hinged joint,
wherein in an open mode of the device, at least one of the first and second camera parts is positioned in a protruded position protruding relative to a surrounding surface, wherein in a closed mode of the device in which the first and second camera parts are rotated towards each other to overlap about the common hinged joint, at least one of the first camera part or the second camera part is adjustably mounted such that contact between the first camera part and the second camera part urges the at least one camera part in the protruded position to withdraw inwardly, aligns the first camera part and the second camera part within a selected angular deviation between respective optical axes and reduces tilt between the first and second camera parts relative to their respective surrounding surfaces.

2. The multi-part electronic device of claim 1, wherein in the open mode of the device, the first and second camera parts are each positioned in respective protruded positions protruding relative to respective surrounding surfaces, and wherein contact between the first and second camera parts urges at least one of the camera parts to withdraw inwardly relative to its protruded position.

3. The multi-part electronic device of claim 1, wherein the first resilient camera mount and the second resilient camera mount are each configured to seal a space between the respective first and second camera part and an opening formed in the respective device part for the camera part.

4. The multi-part electronic device of claim 3, wherein at least one of the first resilient camera mount or the second resilient camera mount is configured for adhesive mounting to an inner surface of the respective device part.

5. The multi-part electronic device of claim 3, wherein at least one of the first resilient camera mount or the second resilient camera mount is configured to allow for translation of the respective camera part in lateral directions approximately perpendicular to an optical axis of the respective camera part.

6. The multi-part electronic device of claim 3, wherein at least one of the first resilient camera mount or the second resilient camera mount comprises a fold of material configured to extend or contract laterally to allow for translation of the respective camera part in lateral directions.

7. The multi-part electronic device of claim 1, wherein each of the first and second camera parts comprises a protection window, and wherein the contact between the first and second camera parts occurs between the respective protection windows.

8. The multi-part electronic device of claim 1, further comprising at least one pair of first and second magnet members, wherein the first magnet member is positioned on the first device part and the second magnet member is positioned on the second device part, the first and second magnet members being configured to interact with each other to move the at least one of the first and second camera parts laterally and into alignment with the other of the first and second camera parts.

9. The multi-part electronic device of claim 8, wherein the first magnet member is stationary and the second magnet member is movable, and wherein the magnetic force between the first magnet member and the second magnet member when the first and second device parts are overlapped is sufficient to cause the second magnet member to move relative to the first magnet member.

10. A method of reducing tilt error in a camera of a multi-part electronic device, comprising:
mounting a first camera part to a first device part such that the first camera part s movable in X, Y and Z directions relative to the first device part;
mounting a second camera part to a second device part such that the second camera part is movable in X, Y and Z directions relative to the second device part;
pivoting the first device part and the second device part towards each other about a hinge by which the first and second device parts are coupled together such that the first camera part and the second camera part contact each other; and urging at least one of the first camera part or the second camera part to move and reduce tilt error based on the contact in a closed position between the first camera part and the second camera part.

11. The method of claim 10, wherein mounting the first camera part to the first device part comprises securing a resilient camera part mount to the first device part.

12. The method of claim 10, wherein mounting the second camera part to the second device part comprises securing a resilient camera part mount to the second device part.

13. A multi-part, electronic device, comprising:
a first camera part mounted on a first device part; and
a second camera part mounted on a second device part, the first and second device parts being coupled together by a common hinged joint, wherein in a closed mode of the device the first and second camera parts are rotated towards each other about the hinge joint to overlap; and
at least one pair of first and second magnet members, wherein the first magnet member is positioned on the first device part and the second magnet member is positioned on the second device part, wherein at least one of the first camera part and the second camera parts is movably mounted relative to the first device part and the second device part, respectively, in the closed mode and the first and second magnet members are configured to magnetically interact with each other in the closed mode to move the at least one movably mounted camera part laterally and into alignment with the other of the first and second camera parts.

14. The multi-part electronic device of claim 13, wherein the first camera part and the second camera part are aligned within a selected angular deviation between respective optical axes.

15. The multi-part electronic device of claim 13, wherein in an open mode of the device, at least one of the first and second camera parts is positioned in a protruded position protruding relative to a surrounding surface, and wherein contact between the first and second camera parts in a closed mode urges the at least one of the first and second camera parts to withdraw inwardly relative to its protruded position.

16. The multi-part electronic device of claim 13, wherein the first camera part comprises a first resilient camera mount attached to the first device part and the second camera part comprises a second resilient camera mount attached to the second device part.

17. The multi-part electronic device of claim 16, wherein the first resilient camera mount and the second resilient camera mount are each configured to seal a space between the respective first and second camera part and an opening formed in the respective device part for the camera part.

18. The mufti-part electronic device of claim 16, wherein at least one of the first resilient camera mount or the second resilient camera mount is configured for adhesive mounting to an inner surface of the respective device part.

19. The multi-part electronic device of claim 16, wherein at least one of the first resilient camera mount or the second resilient camera mount comprises a fold of material configured to extend or contract laterally to allow for translation of the respective camera part in lateral directions.

20. The mufti-part electronic device of claim 16, wherein each of the first and second camera parts comprises a protection window, and wherein the contact between the first and second camera parts occurs between the respective protection windows.

* * * * *